Jan. 2, 1951 W. A. MILLER 2,536,654

PULSE MULTIPLEX TRANSMISSION SYSTEM

Filed Jan. 4, 1947 3 Sheets-Sheet 1

INVENTOR
William A. Miller
BY
H. G. Grover
ATTORNEY

PULSE MULTIPLEX TRANSMISSION SYSTEM

Filed Jan. 4, 1947 3 Sheets-Sheet 2

INVENTOR
William A. Miller
BY H. S. Grover
ATTORNEY

Jan. 2, 1951 W. A. MILLER 2,536,654

PULSE MULTIPLEX TRANSMISSION SYSTEM

Filed Jan. 4, 1947 3 Sheets-Sheet 3

INVENTOR
William R. Miller
BY H. S. Grover
ATTORNEY

Patented Jan. 2, 1951 2,536,654

UNITED STATES PATENT OFFICE 2,536,654

PULSE MULTIPLEX TRANSMISSION SYSTEM

William A. Miller, Port Jefferson, N. Y., assignor to Radio Corporation of America, a corporation of Delaware Application January 4, 1947, Serial No. 720,261

12 Claims. (Cl. 250—9)

This invention relates to a multiplex communication system utilizing spaced pulses of electrical energy, in which the pulses corresponding to the separate channels are separately and consecutively generated at a fixed repetition rate, and time or phase displaced by the modulation. In this type of system, each cycle of operation includes a plurality of equal width (duration) channel pulses and a synchronization pulse of different (preferably longer) width or duration. The pulses in each channel are time displaced by the modulation, a predetermined amount, and the maximum displacement equivalent to 100% peak modulation is such as to leave a guard space between pulses from succeeding channels. This guard space between pulses from succeeding channels is necessary to reduce cross-modulation effects. The pulses from other channels occur in the interval between adjacent pulses from any one channel.

An object of the invention is to provide a pulse multiplex system whose output pulses to a transmitter are of rectangular wave form and which avoids the necessity of employing limiter stages for obtaining this rectangular wave form.

Another object is to provide a pulse multiplex transmitter system which employs a plurality of cascade-connected self-restoring trigger circuits for each signal transmitting channel.

A further object is to provide a multiplex transmitting system which is simple in design and requires a small number of vacuum tube structures for each channel for producing time displaced pulses of rectangular wave form.

Figure 1:
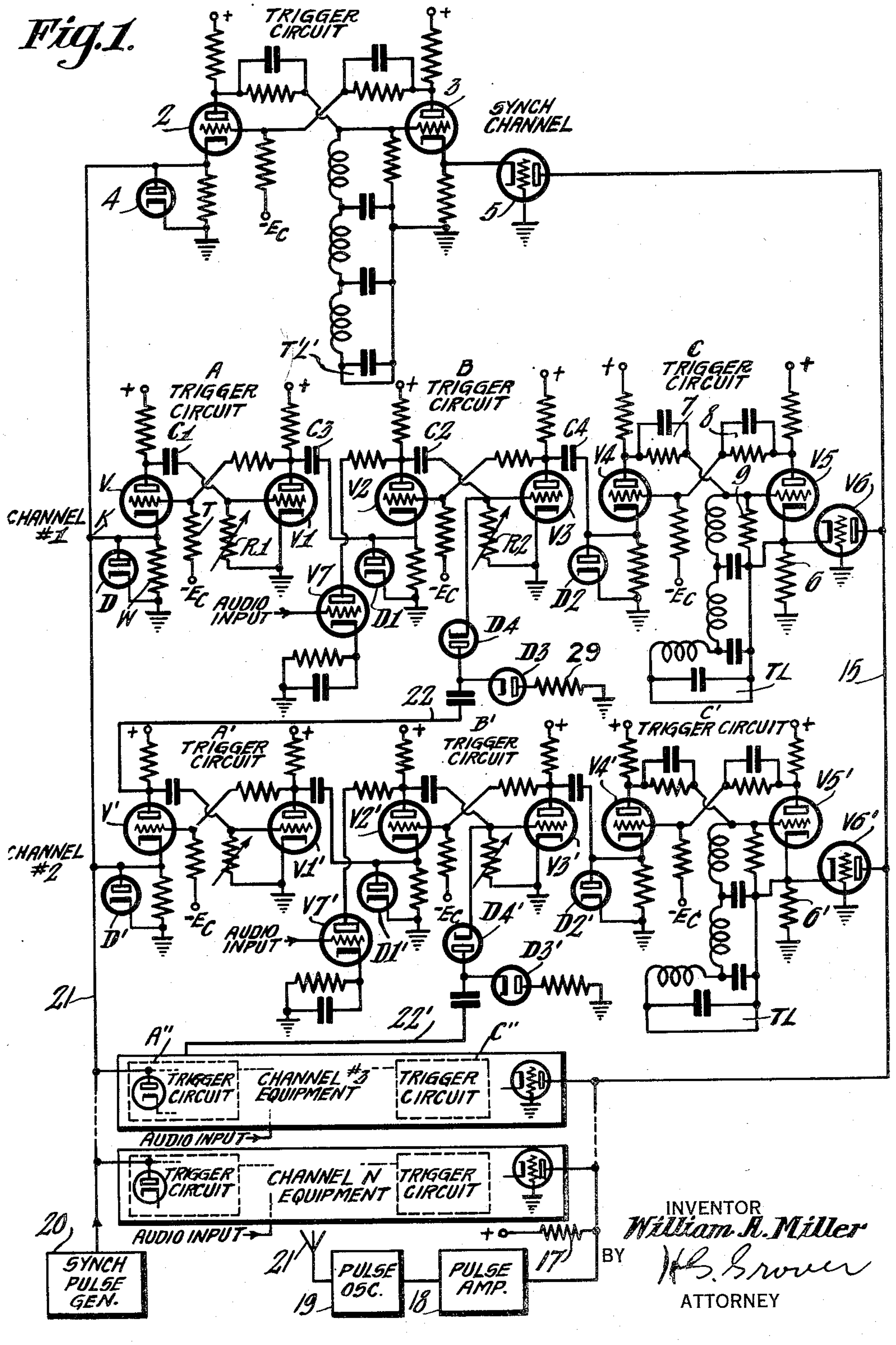
Figure 2:
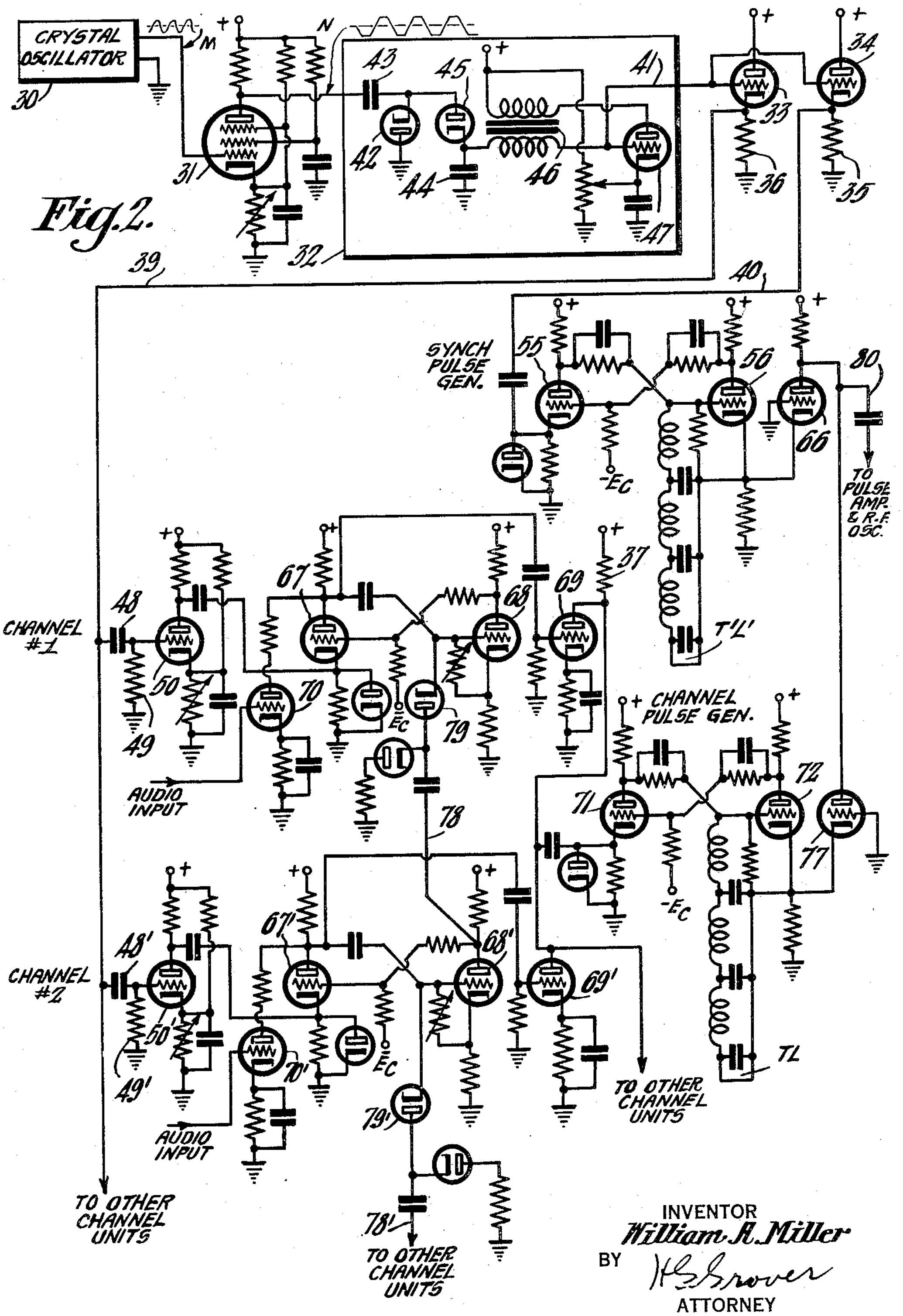
Figure 3:
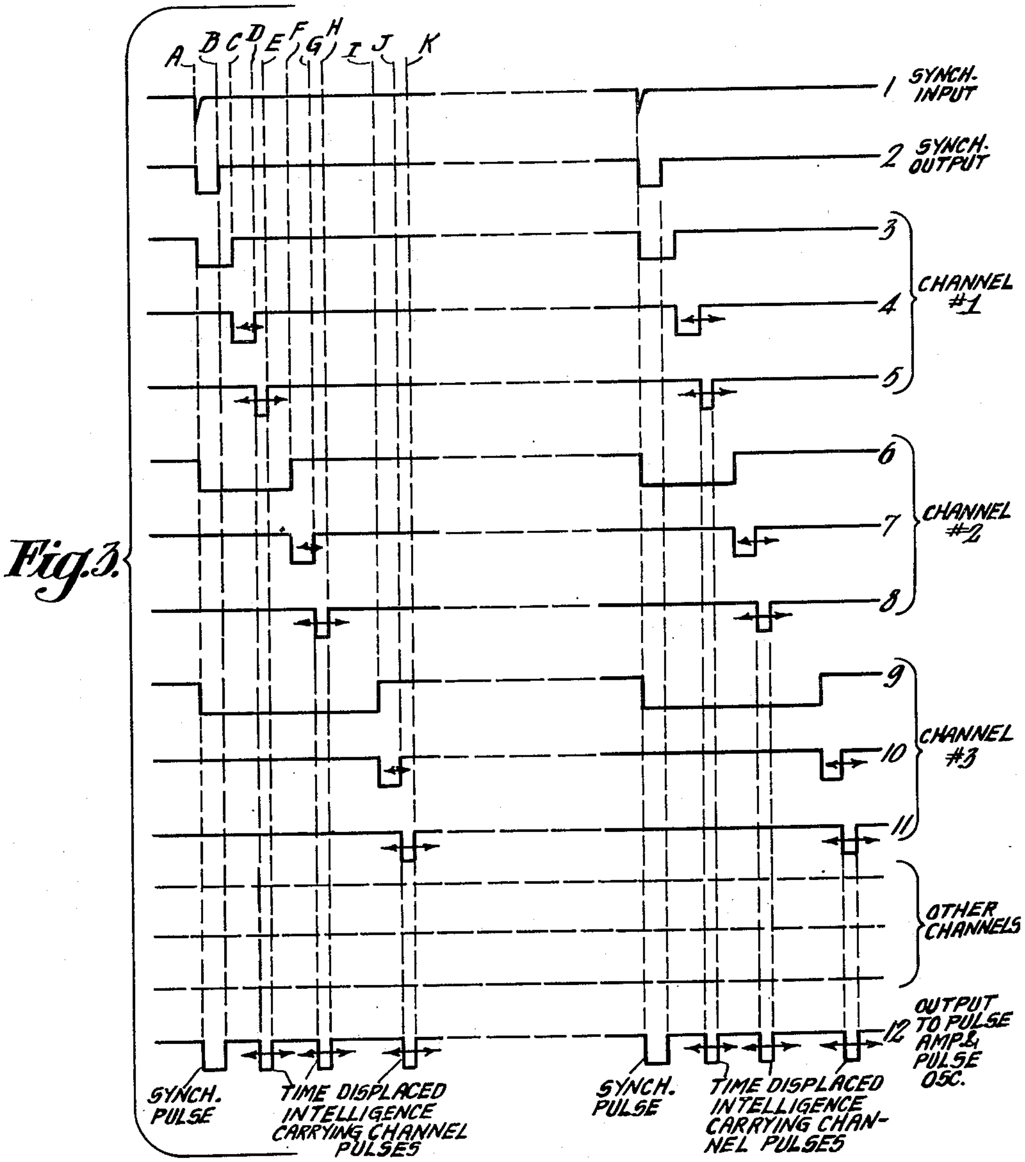

The following is a more detailed description of the invention, in conjunction with a drawing, wherein:

Figs. 1 and 2 illustrate different transmitting circuits of the pulse multiplex communication system of the invention; and Fig. 3 illustrates a series of curves given in explanation of the operation of the system of the invention.

Referring to Fig. 1, there are shown a plurality of signal or intelligence transmitting channels identified as channel 1, channel 2, channel 3, etc. to channel N, and also the synchronizing channel for producing a synchronizing pulse. The apparatus in channels 1, 2, and 3 up to channel N have similar equipments and operate similarly, except for different time constants in certain trigger circuits of these channels. For this reason, only channels 1 and 2 have been illustrated in detail, it being understood that channels 3, 4 etc. and channel N are similarly equipped.

Each channel is provided with three self-restoring trigger circuits arranged in cascade relationship. The first trigger circuit may be referred to as a channel selector, while the second trigger circuit for each individual channel may be referred to as a modulating trigger circuit. All of the first or channel selector trigger circuits of all the channels operate simultaneously upon the occurrence of a synchronizing pulse produced by the synchronizing pulse generator 20 and appearing in the common lead 21 in circuit with the inputs of all the channels. It should be understood, however, that the first trigger circuits of all the signal channels, although operating simultaneously, have different time constants.

Referring to channel 1, for example, the apparatus in this channel comprises a first self-restoring trigger circuit A, a second self-restoring trigger circuit B, and a third self-restoring trigger circuit C. Trigger circuit A comprises a pair of vacuum tubes V and V1 which, if desired, could be included within a single evacuated envelope. The grid and anode structures of trigger circuit A are interconnected to provide a regenerative action. The anodes of tubes V and V1 are supplied with positive polarizing potentials from the positive terminal + of a source of directional potential through separate resistors. The anode of tube V is connected to the grid of tube V1 through a condenser C1, while the anode of tube V1 is connected to the grid of V through a resistor. The grid of tube V is connected to the negative terminal —EC of a source of biasing potential through a resistor T. The grid of tube V1 is connected to ground and to its cathode through an adjustable resistor R1. The cathode of tube V is connected to ground through a relatively high resistor W, in turn shunted by a diode D. This diode D is an open circuit for the negative input pulse applied to terminal K. Such negative impulses applied to the cathode of tube V will cause this tube to conduct, and in conducting, this tube will draw electrons from ground, through D, shunting out the high resistance W. The diode D will dissipate all positive pulses, thus such pulses will not affect the behavior of the trigger. The purpose of the diode D, is thus to provide a high impedance tripping circuit input without causing as much degeneration as the purely ohmic resistance W, which is of the order of $\frac{1}{10}$ of a megohm.

In the operation of trigger circuit A, tube V is normally non-conductive and biased to cut off by means of source —EC. Tube V1, however, is normally in a conductive state and passes current because its grid is maintained at or near zero bias. This condition of operation wherein tube V is normally non-conductive and tube V1 is normally conductive is called the stable state. In the active or tripped state, however, the current passing conditions of the tubes V and V1 are reversed from that just described. After an interval of time in the active state (depending in part upon the time constant of condenser C1 and resistor R1), the trigger circuit A will restore itself to the stable state. In order to change the trigger circuit A from the stable state to the active state, it is necessary to apply a negative pulse to terminal K of sufficient magnitude to trip the trigger circuit; that is, to reverse the current passing conditions of the two tubes V and V1. These negative tripping pulses are supplied over a common lead 21 from the synchronization pulse generator 20.

Trigger circuit B is simiiar in construction and design to trigger circuit A, except for the length of time it remains in the active state. This trigger circuit B is composed of a pair of vacuum tube triodes V2 and V3 whose grid and anode electrodes are interconnected regeneratively. It is also provided with a diode D1 in the cathode circuit of tube V2. Tube V2 is normally non-conductive and tube V3 normally conductive in the stable state, and the current passing conditions of these two tubes are reversed in the active state. Trigger circuit B is tripped from its stable state to its active state by means of a negative pulse obtained from the anode of tube V1 via condenser C3 which couples the anode of tube V1 to the anode of diode D1. This negative pulse is to trip trigger circuit B, and occurs when the trigger circuit A restores itself to the stable state; or, stated in other words, trigger circuit B will turn on or become activated when trigger circuit A turns off or returns to its stable state. The active period of the trigger circuit B is determined by the time constant of condenser C2 and resistor R2 together with the anode resistor of tube V2 and the direct current resistance of tube V2. In circuit with the anode of tube V2 of the trigger circuit B there is shown a triode vacuum tube V7 which is biased to operate class A on the audio input voltage supplied to its grid. Tube V7 varies the discharge rate of condenser C2 of trigger circuit B and hence varies the active time of this trigger circuit. Thus it will be seen that the tube V7 provides a discharge path for the condenser C2 which is independent of everything but the audio frequency modulating voltage. The audio input supplied to the grid of tube V7 may be speech message waves or other modulation for channel 1. It will thus be seen that the output of trigger circuit B is a pulse whose width or duration is modulated by the audio signal applied to this particular channel.

Trigger circuit C in channel 1 comprises vacuum tubes V4, V5 and diode D2, which operates in a manner similar to trigger circuits A, B except for the time constants involved and the fact that trigger circuit C has its active period controlled by an artificial line TL. As stated before, trigger circuit C is also a self-restoring trigger circuit. It requires a negative input pulse from trigger circuit B via condenser C4 to trip it from the stable to the active state. This negative input pulse to trip trigger circuit C occurs when trigger circuit B turns off or restores itself to the stable state. Transmission line TL is an artificial line comprising a plurality of identical sections of series inductance and shunt capacitance. One end of the line TL is connected to the grid of tube V5 while the other end is short-circuited, as shown. A resistor 9 is provided whose value is equal to the characteristic impedance of the line TL to insure dissipation of the pulse reflected from the short-circuited end of the line. It should be noted that the anodes and grids of tubes V4 and V5 are interconnected by parallel combinations of condensers and resistors 7 and 8. These condenser-shunt-resistor combinations assure extremely rapid current increase and current decay in the trigger circuit. When the trigger circuit C is tripped or activated by a negative pulse applied to the cathode of tube V4 from trigger circuit B, tube V4 will become conductive and tube V5 non-conductive. A negative pulse will then flow down the transmission line TL from the grid of tube V5 to the short-circuited end. At the short-circuited end of line TL, this pulse will be reversed in polarity, as a result of which a positive polarity pulse will be sent back over line TL toward the grid of tube V5. As long as line TL remains negatively charged due to the application of a negative pulse from the anode of tube V4, tube V5 will be cut off; but just as soon as the line TL is completely discharged by the reflected pulse arriving at the sending end of the line TL, the negative bias on the grid of tube V5 disappears, as a result of which the bias —EC becomes effective to turn tube V4 off and tube V5 on, hence ending the active period of trigger circuit C. It will thus be seen that the active period of trigger circuit C is the time the line TL remains charged. This trigger circuit is thus a line-controlled trigger circuit whose period depends upon the time delay due to the artificial line. A trigger circuit of this type is described in my copending application Serial No. 546,890, filed July 27, 1944, Patent No. 2,445,448 granted July 20, 1948, to which reference is herein made.

In circuit with the cathode of tube V5 of trigger circuit C there is provided a vacuum tube V6 whose grid is grounded. When tube V5 conducts (during the stable state of trigger circuit C), it draws current through its cathode resistor 6 of an amount sufficient to develop a voltage across this resistor which places a positive bias on the cathode of tube V6, thus cutting off tube V6. Each time trigger circuit C becomes active, that is, turns on, tube V5 becomes non-conductive, as a result of which the bias on the cathode of tube V6 is reduced to zero and current is permitted to flow through tube V6. A pulse of voltage is then built up across resistor 17 in common to the outputs of all the channels. It should be noted that the outputs of all channels are interconnected by means of a common lead 15.

The delay of trigger circuit A of channel 1 is such that its active period ends half way between the synchronizing pulse on lead 21 and the first channel pulse, if modulation is absent. The delay time (zero modulation) of trigger circuit B is adjusted to be half as long as the delay time of trigger circuit A. The delay time of trigger circuit C, which produces a short square pulse, is controlled by the transmission line TL.

If the synchronizing pulse repetition rate is F pulses per second and there are N+1 channels, wherein N is the number of intelligence channels and 1 the synchronizing pulse producing channel, the time allotted to each channel is $$\frac{1}{(N+1)F}$$

The delay time of trigger circuit A' in channel 2 is adjusted so that it turns off at a time just one-half the time between the first and second channel pulses (unmodulated). Trigger circuit B' of channel 2 has the same delay as trigger circuit B of channel 1. Trigger circuit C' of channel 2 has the same delay as trigger circuit C of channel 1.

The delay time of the trigger circuit A'' of channel 3 (the first trigger circuit of this channel) is adjusted so that it turns off at a time just one-half the time between the second and third unmodulated channel pulses. The other trigger circuits in channel 3 corresponding to trigger circuits B and C of channel 1 have the same time delays as these respective trigger circuits, in the same manner as described above in connection with channels 1 and 2.

All of the first trigger circuits in the different signal channels will operate at the same time on each synchronizing input pulse but will have different active periods and hence turn off at different times to control their respective modulator trigger circuits.

There is also provided a synchronizing channel in the form of a self-restoring trigger circuit comprising triode vacuum tubes 2 and 3 having in circuit therewith a diode 4 and a transmission line T'L'. This trigger circuit in the synchronizing channel is similar in construction and in operation to the trigger circuit C of channel 1, except for the fact that the time delay of the transmission line T'L' is different from the time delay of TL. Putting it in other words, the active period of the trigger circuit 2, 3, 4 is different from the active period and longer than that of the trigger circuit C. It should be noted that the synchronizing channel trigger circuit 2, 3 obtains its tripping input pulse over the common input lead 21 from the common synchronizing pulse generator 20. In circuit with the cathode of tube V3 of the synchronizing channel is a vacuum tube V5 whose grid is grounded and operates in a manner similar to tube V6 of channel 1.

The common output circuit comprises a pulse amplifier 18 and a pulsed oscillator 19 coupled to the output lead 15 for all channels. The pulsed oscillator 19 may comprise a magnetron or a Klystron whose output is coupled to a suitable wave directive structure 21.

A better understanding of the operation of the circuit of Fig. 1 may be had by referring to the series of curves of Fig. 3. Curve 1 illustrates when the negative input pulse occurs in the common input lead 21. Curve 2 indicates the output from the synchronizing channel. Curve 3 represents the pulses from trigger circuit A. Curve 4 represents the pulses from the trigger circuit B. Curve 5 represents the pulses from the trigger circuit C.

It should be noted at this time that the negative synchronizing input pulse at time A starts the trigger circuits 2, 3 in the synchronizing channel at the same time as it starts the trigger circuit A in channel 1. Trigger circuit A, as indicated in curve 3, turns off or restores itself to its stable state at a time which is half way between the synchronizing pulse of curve 1 and the first channel pulse of curve 5, assuming no modulation. The double arrow on the trailing edge of curve 4 indicates a width modulated pulse for channel A whose duration depends upon the modulation for that channel. The double arrow through the leading and trailing edges of the pulse in curve 5 indicates a time modulated pulse of a constant width.

Curve 6 of Fig. 3 represents the active time or output pulse for trigger circuit A' of channel 2, which terminates at time F. Curve 7 represents the active time or output pulse of trigger circuit B' of channel 2, while curve 8 represents the active time or output pulse of trigger circuit C' of channel 2. The pulses of curve 7 are width modulated pulses whose durations depend upon the modulation or audio input for that particular channel. Curve 9 represents the active time or output pulse of the first trigger circuit of channel 3 corresponding to the trigger circuits A and A' of channels 1 and 2. Curve 10 represents the width modulated pulses of the second trigger circuit of channel 3 corresponding to the trigger circuits B and B' of channels 1 and 2. Similarly, curve 11 represents the time modulated pulses of constant width produced by the third or last trigger circuit of channel 3 corresponding to trigger circuits C and C' of channels 1 and 2.

It should be noted from a study of Fig. 3 that all the first trigger circuits of all the signal channels, and also the synchronizing channel, are activated or turned on at the same time by the negative polarity synchronizing input pulse on lead 21, although all these trigger circuits have different active periods. Thus the synchronizing channel trigger circuit is turned on at time A and will turn off at time B, while trigger circuit A of channel 1 which turns on time A will turn off at time C, and trigger circuit A' of channel 2 which turns on at time A will turn off at time F, and trigger circuit A'' of channel 3 which turns on at time A will turn off at time I. When trigger circuits A' and A'' turn off, they respectively turn on trigger circuits B' and B'', and when these last trigger circuits turn off they in turn will turn on trigger circuits C' and C'', respectively.

The resulting output from all the channels is shown in curve 12 and is applied to the pulse amplifier 18. It should be noted that the synchronizing pulse in curve 12 is of longer duration than the individual intelligence or signal pulse, and that these intelligence or signal pulses from the different channels are of the same width or duration, although time displaced by their associated audio signals.

The output from antenna 21 is in the form of a train of pulses of ultra high frequency waves whose durations and spacings correspond to the pulses of curve 12.

The undeviated output of the circuit of Fig. 1 consists of a series of pulses of repetition rate (N+1)F, of which every (N+1)th is the synchronizing pulse, and the first pulse after the synchronizing pulse is from channel 1, the second pulse from channel 2, the third pulse from channel 3, etc. If audio frequency voltage is applied to the audio input of channel 1, then only the pulse of channel 1 will be deviated; likewise for channel 2, etc.

If it is desired that there be in all nine signal channels and one synchronizing channel, then all that is needed is a 10 kilocycle synchronizing pulse supplied by the synchronizing pulse generator 20. The final pulse output from the antenna 21 will be at a 100 kilocycle pulse repetition rate.

In order that high levels on channel 1 will not cause the channel 1 pulse to occupy a time interval allotted to the pulse of channel 2, the anode of vacuum tube V' of trigger circuit A' of channel 2 is connected via lead 22 and diode D4 to the grid of tube V3 of trigger circuit B of channel 1. Thus, when trigger circuit A' of channel 2 restores itself to the stable state (turns off), a positive pulse is applied to the grid of tube V3 of trigger circuit B. If trigger circuit B is in the stable state (in which tube V3 is already conducting), nothing will happen, but if trigger circuit B has not yet restored itself, the positive pulse on lead 22 will restore trigger circuit B to its stable state and cause tube V3 to conduct, thus turning off channel 1. The negative pulses on lead 22, which occur when trigger circuit A' of channel 2 turns on, are by-passed to ground by diode D3. The resistor 29 in series with the anode of diode D3 is important in the operation of the system because when the trigger circuit B is changed from the stable state to the active state there must be a negative going pulse present on the grid of V3. This would be hard, if not impossible to accomplish, if this resistor were not present since D4 and D3 would be a low impedance to ground if the anode of D3 were directly connected to ground. The resistor 29 must be small enough to allow the condenser in the line 22 to discharge in the intra-channel time but not small enough to hamper the triggering action of B.

If all the channels are interconnected in this manner, no channel interference will occur due to greater than 100% modulation. Stated otherwise, the inter-connection between the channels prevents cross modulation and assures a guard space between the output pulses from succeeding channels. As an illustration only, each channel pulse may occur at a rate of 10 kilocycles and the separation between adjacent pulses in each channel for an unmodulated condition may be 100 microseconds. Hence, the channel pulses may be spaced 10 microseconds apart in the common output circuit. The pulses in each channel can be modulated plus and minus 3½ microseconds (peak modulation), thus having a guard space between pulses from succeeding channels of about 3 microseconds. The radio frequency output from the pulse oscillator 19 may be of the order of 1000 megacycles or higher.

Fig. 2 illustrates another and a preferred embodiment of a pulse multiplex transmitting system which has the advantage over Fig. 1 of requiring fewer tubes for the equipment of each channel. Here again, as in Fig. 1, trigger circuits are employed as modulators, but the outputs from the various intelligence channels are coupled in common to a channel pulse generator.

Referring to Fig. 2 in more detail, there is shown a constant frequency oscillator 30, for example, a crytsal controlled oscillator, which is carefully adjusted to produce a constant frequency (N+1)F, wherein N is the number of intelligence carrying channels and F is the synchronizing pulse repetition rate, as described above in connection with Fig. 1. The output of oscillator 30 designated by waveform M is coupled to a vacuum pentode threshold and peak limiter 31 which serves to generate square topped (and bottomed) waves from the sine wave oscillations supplied thereto. This output designated by waveform N is fed to a counter circuit 32 which includes a condenser 43, a pair of diodes 42 and 45 (which may be arranged within a single evacuated envelope or comprise two separate tubes, as shown), a condenser 44, a normally non-conductive triode vacuum tube 47, and a pulse transformer 46. This counter may be called a step-wave generator since its output (which is supplied via lead 41 to the grids of cathode follower tubes 33 and 35) is in the form of a series of steps or stairs corresponding to the incremental voltage increases counted by the counter. Condenser 43 is of much smaller value than condenser 44 and may have a ratio, for example, of anywhere in the range of 1 to 15 to 1 to 20. Tube 47 and transformer 46 in the counter circuit may be considered as a one-shot pulse oscillator which passes a voltage pulse when the voltage stored on the condenser 44 reaches a critical value sufficient to overcome the cut-off bias on the tube 47. The bias resistor R in the cathode circuit of tube 47 is adjusted so that tube 47 is non-conductive until the grid voltage stored on the condenser 44 reaches a value corresponding to N+1 impulses supplied thereto by the oscillator 30.

In the operation of the counter circuit, diode 42 will not conduct for the positive rising edge of a pulse from the limiter 31 but diode 45 will conduct; and hence the circuit will appear as though the two condensers 43 and 44 are in series to ground. Hence, for example, one-twentieth of the total input voltage appears across condenser 44 (for the foregoing assumption that condenser 43 has a size which is one-twentieth that of condenser 44). On the negative falling edge of the pulses from the limiter 31, diode 42 will conduct but diode 45 will not conduct, leaving unchanged the voltage on condenser 44 acquired during the immediately preceding rise of the pulse. The voltage on condenser 43 will be completely discharged through diode 42 during the negative drop. During the next positive rise of the pulse applied to the counter by the limiter, the condenser 43 will recharge through diode 45. Each time there is a positive rise in voltage applied by the limiter 31 to the condenser 43, there will be an incremental increase or step-up in voltage on condenser 44, although the charge on condenser 44 for each increase is slightly less than the preceding one. It should be noted that there is no resistance established across condenser 44 because it is desired that there be complete absence of current or charge leakage on this condenser during the voltage step-up operation.

The step-up of the charge on condenser 44 at the end of a desired rise (the ninth rise if nine channels are employed) will cause vacuum tube 47 to start conducting very suddenly, as a result of which a pulse of current is passed through transformer 46 which is so poled that it applies a very sharp positive pulse to the grid of tube 47, thus expediting or hastening the flow of current from the tube 47. Stated otherwise, tube 47 and transformer 46 are, in effect, an over-biased pulse oscillator which is connected regeneratively to produce only one pulse in response to the application of a voltage stored on condenser 44 which reaches or exceeds the critical value of the tube 47. When tube 47 conducts, it produces a low impedance path for the charge on condenser 44. This condenser 44 then discharges through tube 47 to a relatively low value. The counter 32 can be arranged to provide a different number of steps or rises in the wave output therefrom by varying the ratio of the capacitance value of condenser 43 and 44, if a different number of channels are employed.

The tubes 33 and 34 are merely cathode followers which derive a step voltage wave input from the counter circuit over lead 41. These cathode followers or coupling amplifiers provide an output from their respective cathodes of the same polarity and voltage as the input wave taken from condenser 44, without loading this condenser. These tubes do not draw grid current but provide substantially unity amplification. The step wave output is taken from the cathode tube 33 and supplied via lead 39 to the various channels 1, 2 etc. A similar step-wave output is taken from the cathode of tube 34 and then supplied to the synchronizing pulse generator 55, 56, which in effect is a self-restoring type of line controlled trigger circuit having a stable state and an active state. The reason for the use of two cathode follower tubes 33 and 35 is to prevent any back-coupled pulses from the synchronizing pulse generator 55, 56 from being fed into the apparatus of the intelligence channels. The values of resistors 36 and 35 in the cathode circuits of the cathode followers 33 and 34 are so chosen that each incremental step or rise in voltage applied to these tubes is passed with little loss in voltage to the output circuits for these cathode follower tubes.

The trigger circuit 55, 56 comprises a synchronizing pulse generator and is of the same type described above for the trigger circuit 2, 3 constituting the synchronizing channel of Fig. 1. The artificial line T'L' which controls the duration of the active period of the self-restoring trigger circuit 55, 56 has a sufficient number of sections to cause the output from this synchronizing pulse generator to be long enough to be used as a synchronizing pulse. The input to the synchronizing pulse generator is a negative pulse of sufficient magnitude to trip the trigger circuit 55, 56 from its stable to its active state. This negative input pulse is obtained from the cathode tube 34 over lead 40. When the counter circuit 32 discharges the condenser 44 at the end of the step-wave and tube 47 becomes non-conducting, the cathode of tube 34 falls from some highly positive potential to ground, as a result of which a negative pulse is applied to lead 40 for tripping or activating the synchronizing pulse generator.

The cathode resistor 36 of the cathode follower tube 33 has exactly the same voltage steps produced across it as the cathode resistor 35 of tube 34. The step wave voltage produced across the resistor 36 is impressed on the first tubes 50, 50' etc. of the main channel apparatus, labeled "Channel 1," "Channel 2," etc. Tubes 50, 50' etc. may be referred to as channel selectors and are normally non-conductive though biased differently. Channel selector 50 of channel 1 is biased to conduct on the first riser in the applied step wave voltage. The channel selector 50' in channel 2 is biased to conduct on the second riser of the step wave voltage (which is a voltage higher than the bias on the first channel selector). The third, fourth, fifth, sixth etc. succeeding channels (not shown) are arranged to conduct sequentially at different risers or steps in the step wave voltage applied to the different channel selectors by the cathode follower or coupling amplifier 33. For example, in channel 3 current will flow in the associated channel selector on the third riser in the step wave, while in channel 6 current will start to flow in its associated channel selector tube on the sixth rise in the applied step wave. The step amplitude at which each channel selector conducts is determined by the cathode bias which is developed across its adjustable cathode resistor and shunt condenser. Different adjustments of the cathode resistor will give different cathode biases.

After each channel selector 50, 50', etc. (which is normally non-conductive) starts to conduct, further risers in the step input wave on lead 39 will not produce any appreciable anode current increase in that channel selector because of grid current limiting due to resistor 49, 49' etc. Stated in other words, each channel selector is caused to carry current starting on the particular step riser which furnishes a voltage of sufficient magnitude to overcome its cut-off potential and this channel selector will continue to pass current to the end of the step wave voltage. Let it be assumed that the channel selector 50 for channel 1 starts to conduct on the first riser in the step wave voltage at a value of 35 volts. When the second riser in the step wave voltage occurs, the first channel selector 50 is already passing current. The increase in voltage in the step voltage wave appearing in the output of the coupling amplifier 33 will merely cause the grid of the first channel selector to draw current, and the channel selector thus acts very much like a diode between its grid and cathode to cause anode limiting. Hence, as each additional channel selector after the first starts to conduct (when additional rises occur in the step wave), the preceding channel selectors which are already conducting will continue conducting with substantially the same anode current as before. After the ninth riser in the step wave voltage (assuming nine signal channels), the amplitude of the step wave voltage falls down to its minimum value and all channel selectors will cease conducting. The time constant of condenser 48 and resistor 49 in the input circuit of each channel selector is chosen large enough to maintain current flow through the channel selector until the counting cycle is over. This cycle of operations will repeat itself for each new step wave voltage.

Since the different channels have substantially the same equipment except for the bias adjustment on the channel selectors as mentioned above, only the equipment in one channel will be described. It should be noted that only two channels have been shown and that the elements in the channel 2 which are equivalent to those in channel 1 have been given the same reference numerals but with prime designations. Each channel includes a channel selector such as 50, a pulse width trigger circuit 67, 68 used as a modulator, and an output tube 69. The trigger circuit 67, 68 is a self-restoring trigger circuit and has in circuit with one of the tubes (for example the tube 67 which is normally non-conducting) a vacuum tube 70 which is biased to operate class A on an audio input to its grid. This pulse width trigger circuit modulator is substantially identical in operation to the pulse width trigger circuits of each of the channels described in the system of Fig. 1. The intelligence or speech waves (identified by the label "audio input") are applied to the tube 70. The modulator 67, 68 obtains a negative tripping pulse from the channel selector 50 when this selector conducts. This negative input pulse is applied to the cathode of the tube 67 and trips the trigger circuit from its stable to its active stage. Tube 70 varies the active time of the pulse width modulator in accordance with the audio signal input, and causes the width or duration of the output pulse from the modulator to vary in accordance with the intelligence. Triode tube 69, whose grid is connected to the anode of tube 67, is normally non-conductive. When the trigger circuit 67, 68 returns to its stable state, a positive pulse is supplied to the grid of tube 69 and causes this tube to conduct. When tube 69 conducts, there is a voltage drop in resistor 37 which causes the application of a negative tripping pulse to the channel pulse generator 71, 72. It should be noted that resistor 37 is in common with outputs of all the triode tubes 69, 69′ etc. of the different signal channels, and that the channel pulse generator 71, 72 is also in common with outputs of the signal channels.

The channel pulse generator 71, 72 is of the self-restoring type and has its active period controlled by an artificial line TL. It operates in a manner similar to the synchronizing pulse generator, except for the duration of the active period which, in turn, is controlled by the time constant of the artificial line. The channel pulse generator 71, 72 produces a pulse of extremely short duration, and this pulse appearing on the cathode of tube 72 is applied to the cathode of triode 77. Triode 77 has its grid connected to ground and is normally non-conductive. When the channel pulse generator is activated or tripped, the tube 77 conducts for the duration of the active period of the channel pulse generator.

It should be noted that the output from the synchronizing pulse generator 55, 56 is also derived from the cathode of tube 56 which is connected to the cathode of triode 66. Triode 66 is normally non-conductive and operates to pass a pulse of current for the duration of the active period of the synchronizing pulse generator. It should be noted that the anode of the tube 66 is connected to the anode of tube 77 and that both anodes are connected via lead 80 to a common pulse amplifier and radio frequency oscillator, not shown. Thus the channel pulses are combined with the synchronizing pulses.

Channel 2 operates in substantially the same manner described above in connection with channel 1. When selector 50′ is turned on (made to conduct), a negative pulse is passed on to the pulse modulator 67′, 68′ and trips this modulator. When this pulse width modulator 67′, 68′ returns to its stable state, the output of 69′ causes the channel pulse generator 71, 72 to produce a channel pulse for channel 2.

In order that over modulation of channel 1 will not produce interference in channel 2, the positive pulse generated at the beginning of operation of channel 2 at the anode of tube 68′ is fed via lead 78 and diode 79 to the grid of tube 68 of channel 1 in order to assure the fact that the pulse width modulator of channel 1 is restored or returned to its normal stable state. This prevents interference and makes it impossible for the pulse width modulator trigger circuit 67, 68 of channel 1 to be in the active state during the time pulse width modulator 67′, 68′ of channel 2 is in the active state. Similar cross connections are employed between channels 2 and 3, and channels 4 and 5, etc. Substantially the same feature has been described above in connection with Fig. 1, to prevent cross modulation of the channels.

The resultant output of the transmitting system of Fig. 2 is similar to the showing curve 12 of Fig. 3.

An important advantage of the present invention is that I am able to obtain a square wave output for the pulse amplifier and radio frequency oscillator without the necessity of utilizing limiting stages in the output of the system.

What is claimed is:

1. A transmitting terminal station for a pulse multiplex communication system wherein a common transmission medium is sequentially assigned to a plurality of channels on a time division basis, comprising synchronizing channel apparatus having a self-restoring trigger circuit, a plurality of signal channel circuits each including a self-restoring regenerative trigger circuit and a signal modulating circuit coupled to said trigger circuit for varying the active time thereof in dependence upon the modulation, whereby the output from said trigger circuit is a width modulated pulse, a source of tripping pulses in common to the input elements of all said signal channel circuits and said synchronizing channel, means for converting the width modulated pulses in said signal channel circuits to time displaced constant duration pulses, and a common output circuit for all channel equipment, said common output circuit including a radio frequency oscillator and a wave directive structure coupled to said oscillator.

2. A transmitting terminal for a pulse multiplex communication system wherein a common transmission medium is sequentially assigned to a plurality of channels on a time division basis, comprising a synchronizing pulse producing circuit in the form of a self-restoring trigger circuit, a plurality of signal channel circuits each including a pulse width modulator in the form of a self-restoring regenerative trigger circuit having a signal modulating circuit coupled thereto to vary the active time thereof, a source of pulses connected in common to all of said trigger circuits for activating the same, means for converting the width modulated pulses in said signal channel circuits to time displaced constant duration pulses, and a common output circuit for said signal channel circuits and for said synchronizing pulse producing circuit, said common output circuit including a radio frequency oscillator and a wave directive structure coupled to said oscillator.

3. A transmitting terminal station for a pulse multiplex communication system wherein a common transmission medium is sequentially assigned to a plurality of channels on a time division basis, comprising synchronizing channel apparatus having a self-restoring trigger circuit, a plurality of signal channel circuits each including a self-restoring regenerative trigger circuit and a signal modulating circuit coupled thereto for varying the active time thereof in dependence upon the modulation, a source of tripping pulses in common to the input elements of all said signal channel circuits and said synchronizing channel, the time constants of said trigger circuits in said signal channels being different, whereby said trigger circuits have different active periods and produce width modulated pulses, means for converting the width modulated pulses in said signal channel circuits to time displaced constant duration pulses, and a common output circuit for said synchronizing apparatus and for said signal channel circuits, said common output circuit including a radio frequency oscillator.

4. A transmitting terminal for a pulse multiplex communication system comprising a source of constant frequency oscillations, means for producing impulses from said oscillations, a counter circuit coupled to said means and producing a cyclically recurrent step wave voltage, each cycle of which has as many steps as the number of signal channel circuits, a pair of coupling amplifiers individually coupled to the output of said counter circuit and each passing said step wave voltage, a plurality of signal channel circuits having their inputs coupled in common to the output of one of said coupling amplifiers, and a synchronizing pulse generator coupled to the output of said other coupling amplifier, each of said signal channel circuits including a normally non-conductive channel selector and a self-restoring trigger circuit modulator having only one degree of electrical stability coupled to the output of the channel selector, whereby said different channel selectors have their inputs supplied in parallel with a recurring step wave voltage whose steps have different voltage values, individual signal modulating circuits for said channel circuits and coupled to said trigger circuits for varying the active time thereof in dependence upon the modulation, said channel selectors being differently biased to become conductive at different steps of the applied step wave voltage, said synchronizing pulse generator comprising a self-restoring trigger circuit having only one degree of electrical stability and which becomes activated at the end of the recurrent step wave voltage cycle, a channel pulse generator comprising a self-restoring trigger circuit having only one degree of electrical stability coupled in parallel to the outputs of said signal channel circuits, said channel pulse generator being responsive to the restoration of the trigger modulator circuits in the different channel circuits for producing time displaced constant duration pulses, and means for combining the outputs of said channel pulse generator and said synchronizing pulse generator.

5. A transmitting terminal for a pulse multiplex communication system comprising a source of constant frequency oscillations, means for producing impulses from said oscillations, a counter circuit coupled to said means and producing a cyclically recurrent step wave voltage, each cycle of which has as many steps as the number of signal channel circuits, a pair of coupling amplifiers individually coupled to the output of said counter circuit and each passing said step wave voltage, a plurality of signal channel circuits having their inputs coupled in common to the output of one of said coupling amplifiers, and a synchronizing pulse generator coupled to the output of said other coupling amplifier, each of said signal channel circuits including a normally non-conductive channel selector and a self-restoring trigger circuit modulator having only one degree of electrical stability coupled to the output of the channel selector, whereby said different channel selectors have their inputs supplied in parallel with a recurring step wave voltage whose steps have different voltage values, individual signal modulating circuits for said channel circuits and coupled to said trigger circuits for varying the active time thereof in dependence upon the modulation, said channel selectors being differently biased to become conductive at different steps of the applied step wave voltage, said synchronizing pulse generator comprising a self-restoring trigger circuit having only one degree of electrical stability and which becomes activated at the end of the recurrent step wave voltage cycle, a channel pulse generator comprising a self-restoring trigger circuit having only one degree of electrical stability coupled in parallel to the outputs of said signal channel circuits, said channel pulse generator being responsive to the restoration of the trigger modulator circuits in the different channel circuits for producing time displaced constant duration pulses, the active time of said channel pulse generator being less than the active time of said synchronizing pulse generator, and means for combining the outputs of said channel pulse generator and said synchronizing pulse generator.

6. A transmitting terminal for a pulse multiplex communication system wherein a common transmission medium is sequentially assigned to a plurality of channels on a time division basis, comprising synchronizing channel apparatus having a self-restoring trigger circuit, a plurality of signal channel circuits each including a self-restoring trigger circuit and a modulating circuit coupled to the trigger circuit for modulating the active time thereof to thereby produce width modulated pulses, a source of pulses in common to the input elements of all said signal channel circuits and said synchronizing channel, means for converting the width modulated pulses in said signal channel circuits to time displaced constant duration pulses, and a common output circuit for all channel equipment, and means comprising back-coupled circuits between trigger circuits in adjacent channels for assuring the restoration of a trigger circuit in one channel when the trigger circuit in the immediately succeeding channel is activated.

7. A transmitting terminal for a pulse multiplex communication system wherein a common transmission medium is sequentially assigned to a plurality of channels on a time division basis, comprising synchronizing channel apparatus having a self-restoring trigger circuit, a plurality of signal channel circuits each including a self-restoring trigger circuit and a modulating circuit therefor, a source of pulses in common to the input elements of all said signal channel circuits and said synchronizing channel, the time constants of said trigger circuits in said signal channels being different, whereby said trigger circuits have different active periods and produce width modulated pulses, means for converting the width modulated pulses in said signal channel circuits to time displaced constant duration pulses, and a common output circuit for all channel equipment, and means interconnecting said channel circuits for assuring that the output pulse of any one channel does not occupy the time allotted to a succeeding channel.

8. A transmitting terminal for a pulse multiplex communication system comprising a source of constant frequency oscillations, means for producing impulses from said oscillations, a counter circuit coupled to said means and producing a cyclically recurrent step wave voltage, each cycle of which has as many steps as the number of signal channel circuits, a pair of coupling amplifiers individually coupled to the output of said counter circuit and each passing said step wave voltage, a plurality of signal channel circuits having their inputs coupled in common to the output of one of said coupling amplifiers, and a synchronizing pulse generator coupled to the output of said other coupling amplifier, each of said signal channel circuits including a normally non-conductive channel selector and a self-restoring trigger circuit modulator having only one degree of electrical stability coupled to the output of the channel selector, whereby said different channel selectors have their inputs supplied in parallel with a recurring step wave voltage whose steps have different voltage values, said channel selectors being differently biased to become conductive at different steps of the applied step wave voltage, said synchronizing pulse generator comprising a self-restoring trigger circuit having only one degree of electrical stability and which becomes activated at the end of the recurrent step wave voltage cycle, a channel pulse generator comprising a self-restoring trigger circuit having only one degree of electrical stability coupled in parallel to the outputs of said signal channel circuits, said channel pulse generator being responsive to the restoration of the trigger modulator circuits in the different channel circuits for producing time displaced constant duration pulses, means for combining the outputs of said channel pulse generator and said synchronizing pulse generator, and means interconnecting the trigger circuit modulator of any one channel with the trigger circuit modulator of a preceding channel for assuring the restoration of the last trigger circuit modulator when the succeeding trigger circuit modulator is activated.

9. A transmitting terminal station for a pulse multiplex communication system wherein a common transmission medium is sequentially assigned to a plurality of channel circuits on a time division basis, comprising a plurality of signal channel circuits each including first, second and third cascade connected self-storing trigger circuits, a signal modulating circuit for varying the active time of the second trigger circuit in each channel circuit in dependence upon the modulation, whereby the output from the second trigger circuit is a width modulated pulse, a connection between the first and second trigger circuits in each channel circuit for tripping the second trigger circuit upon the restoration of the first trigger circuit, a connection between the second and third trigger circuits in each channel circuit for tripping the third trigger circuit upon the restoration of the second trigger circuit, said third trigger circuits producing constant duration pulses, said first trigger circuits having different time constants of such values that upon simultaneous tripping they restore themselves at different times, a source of recurrent tripping pulses in common to the inputs of all of said first trigger circuits, the active period of each first trigger circuit ending at a time subsequent to the termination of the tripping pulse therefor and before the operation of its associated third trigger circuit in the same channel circuit, and a common output circuit coupled to all of said third trigger circuits, said common output including a radio frequency oscillator.

10. A transmitting terminal station for a pulse multiplex communication system wherein a common transmission medium is sequentially assigned to a plurality of channel circuits on a time division basis, comprising synchronizing channel apparatus having a self-restoring trigger circuit, a plurality of channel circuits each including first, second and third cascade connected self-restoring trigger circuits, a signal modulating circuit for varying the active time of the second trigger circuit in each channel circuit in dependence upon the modulation, whereby the output from the second trigger circuit is a width modulated pulse, a connection between the first and second trigger circuits in each channel circuit for tripping the second trigger circuit upon the restoration of the first trigger circuit, a connection between the second and third trigger circuits in each channel circuit for tripping the third trigger circuit upon the restoration of the second trigger circuit, said third trigger circuits producing constant duration pulses, said first trigger circuits having different time constants of such values that upon simultaneous tripping they restore themselves at different times, a source of recurrent tripping pulses in common to the inputs of all of said first trigger circuits and said synchronizing channel apparatus, the active period of each first trigger circuit ending at a time subsequent to the termination of the tripping pulse therefor and before the operation of its associated third trigger circuit in the same channel circuit, and a common output circuit coupled to all of said third trigger circuits and to said synchronizing channel apparatus, said common output including a radio frequency oscillator.

11. A transmitting station in accordance with claim 10 characterized in this, that the self-restoring trigger circuit of the synchronizing channel apparatus has an active period shorter than the active periods of any of the first trigger circuits of the channel circuits.

12. A transmitting terminal station for a pulse multiplex communication system wherein a common transmission medium is sequentially assigned to a plurality of channel circuits on a time division basis, comprising synchronizing channel apparatus having a self-restoring trigger circuit, a plurality of channel circuits each including a self-restoring trigger circuit and a signal modulating circuit coupled to said last trigger circuit for varying the active time thereof in dependence upon the modulation whereby the output from each modulated trigger circuit is a width modulated pulse, a source of tripping pulses in common to the inputs of all signal channel circuits and said synchronizing channel apparatus, means in the different channel circuits and coupled to the inputs of their associated trigger circuits and responsive to the tripping pulses from said source for operating the trigger circuit in the different channel circuits at different non-overlapping times, said trigger circuit in the synchronizing channel apparatus having such time constants that its active period ends before the operation of the trigger circuits in the signal channel circuits, and self-restoring trigger circuit equipment coupled to the modulated trigger circuits in said signal channel circuits and responsive to the width modulated pulses produced in said channel circuits for producing time displaced pulses of constant duration.

WILLIAM A. MILLER.

REFERENCES CITED

The following references are of record in the file of this patent:

UNITED STATES PATENTS

| Number | Name | Date |
|---|---|---|
| 1,956,397 | Nicolson | Apr. 24, 1934 |
| 2,172,354 | Blumlein | Sept. 12, 1939 |
| 2,265,216 | Wolf | Dec. 9, 1941 |
| 2,272,070 | Reeves | Feb. 3, 1942 |
| 2,403 210 | Butement et al. | July 2, 1946 |
| 2,406,165 | Schroeder | Aug. 20, 1946 |
| 2,413,440 | Farrington | Dec. 31, 1946 |
| 2,414,265 | Lawson | Jan. 14, 1947 |
| 2,415,919 | Thomas | Feb. 18, 1947 |
| 2,418,268 | Lawson | Apr. 1, 1947 |
| 2,420,374 | Houghton | May 13, 1947 |
| 2,427,500 | Houghton | Sept. 16, 1947 |
| 2,430,725 | Miller | Nov. 11, 1947 |
| 2,432,204 | Miller et al. | Dec. 9, 1947 |
| 2,489,302 | Levy | Nov. 29, 1949 |